(12) United States Patent
Goehlich

(10) Patent No.: US 12,729,016 B2
(45) Date of Patent: Sep. 8, 2026

(54) SYSTEM FOR SCANNING OR INSPECTING AN AIRCRAFT OR SPACECRAFT SURFACE

(71) Applicant: Airbus Operations GmbH, Hamburg (DE)

(72) Inventor: Robert Alexander Goehlich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 382 days.

(21) Appl. No.: 18/460,906

(22) Filed: Sep. 5, 2023

(65) Prior Publication Data

US 2024/0092505 A1 Mar. 21, 2024

(30) Foreign Application Priority Data

Sep. 16, 2022 (EP) .................................... 22196042

(51) Int. Cl.

| | |
|---|---|
| ***B64F 5/60*** | (2017.01) |
| ***B64U 10/60*** | (2023.01) |
| *B64U 101/26* | (2023.01) |

(52) U.S. Cl.
CPC ................ *B64F 5/60* (2017.01); *B64U 10/60* (2023.01); *B64U 2101/26* (2023.01)

(58) Field of Classification Search
USPC ........................................................ 73/865.8
See application file for complete search history.

(56) References Cited

U.S. PATENT DOCUMENTS

| | | | | |
|---|---|---|---|---|
| 3,149,803 A * | 9/1964 | Petrides | ................ | B64C 39/022 244/17.23 |
| 2016/0200437 A1* | 7/2016 | Ryan | ......................... | B64F 3/00 244/99.2 |
| 2016/0318607 A1* | 11/2016 | Desai | ...................... | A01M 7/00 |
| 2019/0166765 A1* | 6/2019 | Maor | ........................ | G06T 5/50 |

FOREIGN PATENT DOCUMENTS

| | | |
|---|---|---|
| EP | 3567340 A1 | 11/2019 |
| FR | 3080839 A1 | 11/2019 |

OTHER PUBLICATIONS

European Search Report for corresponding European Patent Application No. 22196042 dated Feb. 15, 2023.

* cited by examiner

*Primary Examiner* — Walter L Lindsay, Jr.
*Assistant Examiner* — Warren K Fenwick
(74) *Attorney, Agent, or Firm* — Greer, Burns & Crain, Ltd.

(57) ABSTRACT

A system for scanning or inspecting an aircraft or spacecraft surface. A ground vehicle has a first inspection device, a hovering platform has a second inspection device. The first inspection device is on a first arm of the ground vehicle. The ground vehicle comprises a vertical pole and a transverse holding element extends therefrom. The hovering platform is electrically connected to the ground vehicle through a cable for transferring electrical power and/or data to the hovering platform. The vertical pole and/or transverse holding element carry the cable. The hovering platform is flexibly held on the vertical pole and/or the transverse holding element through the cable or an additional component. The inspection devices determine a characteristic of the surface and identify points of shape deviation by comparison with an intended characteristic. The system succes- (Continued)

sively inspects the surface through the inspection devices being arranged in different heights at the same time.

15 Claims, 3 Drawing Sheets

56
58
60
62
24
40
42
44
64
12
10
4
6
22
18a
18b
20

SYSTEM FOR SCANNING OR INSPECTING AN AIRCRAFT OR SPACECRAFT SURFACE

CROSS-REFERENCES TO RELATED APPLICATIONS

This application claims the benefit of European Patent Application Number 22196042-0 filed on Sep. 16, 2022, the entire disclosure of which is incorporated herein by way of reference.

FIELD OF THE INVENTION

The invention relates to a system for scanning or inspecting an aircraft or spacecraft surface.

BACKGROUND OF THE INVENTION

In the manufacture of fuselage structures, for example for aircraft or spacecraft, the surface quality is desired to meet a high standard. If the fuselage has riveted joints, for example, it is customary practice to examine the quality of the riveted joints by visual and/or tactile inspection and to subject them to selective measurement with measuring tools. For this purpose, individual riveted joints are illuminated from the side and a shadow image is used, for example, to examine whether a rivet is too deep or too high in a hole and to detect other anomalies. In addition, a finger could be run over a rivet and/or a dial gauge may be used to detect protruding or low-lying edges.

Furthermore, surface scanning devices are known that use light projection and image capture techniques to examine surface sections for specific characteristics. These devices are usually hand-held and include a foam frame that is placed on a surface section to be inspected, followed by an optical detection of the area enclosed by the foam frame. If shape deviation points are identified, information on this is stored. This is done in particular in the form of image information in which respective shape deviation points are marked accordingly.

For the inspection of longer rows of rivets on the fuselage of an aircraft or spacecraft, comprising several hundred riveted joints or more, such an inspection is time-consuming.

SUMMARY OF THE INVENTION

It is thus an object of the invention to propose a system and a method with which an inspection of a surface of an aircraft or spacecraft can be conducted as quickly and reliably as possible.

This object may be met by the system having the features of at least one embodiment described herein. Advantageous embodiments and further improvements may be gathered from the following description.

A system for testing an aircraft or spacecraft surface structure is proposed, comprising at least one ground vehicle carrying at least one first inspection device, at least one hovering platform carrying at least one second inspection device, wherein the at least one first inspection device is arranged on a first arm arranged on the at least one ground vehicle, wherein the at least one ground vehicle comprises a vertical pole, wherein a transverse holding element extends from the vertical pole, wherein the at least one hovering platform is electrically connected to the at least one ground vehicle through a cable for transferring electrical power and/or data to the at least one hovering platform, wherein at least one of the vertical pole and the transverse holding element carries the cable, wherein the at least one hovering platform is flexibly held on at least one of the vertical pole and the transverse holding element through the cable or an additional component, wherein the inspection devices are adapted for determining a characteristic of the surface structure and to identify points of shape deviation by comparison with an intended characteristic, and wherein the system is designed for successively inspecting the surface structure through the at least one first inspection device and the at least one second inspection device being arranged in different heights at the same time.

A gist of the invention lies in providing a flexible way of inspecting large surface structures by using a cooperating arrangement of ground-based inspection devices and air-based inspection devices. The ground vehicle may be considered a base of the system, to which all said inspection devices are connected. It may comprise a computing unit that is capable of receiving structure data of the inspection devices.

The at least one ground vehicle may comprise one of various different designs and is preferably capable of traveling on the ground along the surface structure. For example, it may comprise a set of wheels, on which the ground vehicle stands. At least one of the wheels is drivable to move the ground vehicle on the ground on a desired path. As an alternative, it may be placed on rails, wherein the ground vehicle may either actively travel along the rail or wherein it may be pulled and/or pushed along the rail by an external device. Still further, the ground vehicle may instead comprise a set of movable legs, through which the ground vehicle may travel along the ground. Basically, the ground vehicle may be considered a ground-based robot that is able to move on the ground along the surface structure.

The at least one first inspection device is directly attached to the ground vehicle and may be moved relative to the ground vehicle through a movable arm. This allows the first inspection device to be placed in front of several different sections of the surface structure one after another in order to inspect them. It is conceivable that the ground vehicle is capable of moving along the surface structure to a first position, stop there and move the first inspection device to a first section of the surface structure. In this state, the first inspection device inspects the respective section and stores and/or sends data, e.g., to the above-mentioned computing unit. Afterwards, the first inspection device may be moved to a directly adjacent section in order to inspect it. It is conceivable that after inspecting a set of adjacent sections or a pattern of sections in reach of the arm at the fixed position of the ground vehicle, the ground vehicle may be moved further along the surface structure. There, the first inspection device is able to inspect a subsequent number of sections or a pattern of sections in reach of the arm in the actual position of the ground vehicle.

Since the ground vehicle is ground-based, it is conceivable that the at least one first inspection device is dedicated for inspecting the surface of a lower part of the surface structure up to a certain height, wherein the at least one second inspection device is dedicated for inspecting higher portions of the surface structure. The hovering platform may comprise lifting device, such as a set of propellers and electric motors, which are capable of lifting the hovering platform and thus carrying the at least one second inspection device. The hovering platform should be able to move to a desired position and maintain it during the inspection of a certain section of the surface. This allows to eliminate a complicated, heavy and expensive actuation device for moving the at least one second inspection device into larger heights with a required positional precision. By supplying the hovering platform with electrical power from the ground vehicle it may be dimensioned with a considerably low weight and a virtually unlimited hovering time. By connecting the at least one hovering platform to the ground vehicle via a data cable, processing power can be provided inside the ground vehicle. Thus, the respective hardware for navigation tasks, data processing, data analyzing and similar can be arranged inside the ground vehicle, thus reducing the weight of the at least one hovering platform even further.

By holding the cable in the vertical pole and/or the transverse holding element and by flexibly holding the at least one hovering platform on the vertical pole and/or the transverse holding element, the hovering platform is reliably prevented from a descent upon a malfunction. Due to its light weight it may simply be restrained by the cable and/or the additional component. It is thus safely prevented from descending below a certain altitude. By providing the vertical pole and coupling the transverse holding element to it, the cable can be guided roughly in or slightly below the desired flight height. Furthermore, the transverse holding element can be arranged in a sufficient height clearly above the ground, to allow a vertically flexible position of the hovering platform and still reliably arrests the hovering platform in a sufficient height when it experiences an impaired generation of lift.

The inspection devices may be implemented in various different ways. Preferably, as explained in the introduction, it may be designed as an optical scanning device and is designed to check certain characteristics without contact by means of capturing and evaluating an image of a projected pattern of visible light. Such a device is known and commonly used for inspecting aircraft surface structures. However, mechanical scanning devices or scanning devices based on non-visible light are also conceivable.

In an advantageous embodiment, the ground vehicle comprises a reeling drum for the cable, wherein the reeling drum is adapted for providing a tensioning force onto the cable. The reeling drum may be provided for receiving and storing the cable. It may be comparable to a common cable drum which may, if desired, be encapsulated in a housing. To avoid an excessive free cable length outside the reeling drum, i.e., between the transverse holding element and the hovering platform, the reeling drum is capable of constantly retracting the cable. However, the tensioning force should not be excessive in order to still allow the hovering platform to pull the cable out of the reeling drum when moving relative to the ground vehicle. The tensioning force should be dimensioned in a way that the reeling drum is just able to maintain a desired tightness of the cable.

In an advantageous embodiment, the reeling drum is adapted for arresting the cable upon an excessive pulling force from the respective hovering platform or upon power supply interruption of the cable and/or the respective ground vehicle. Thus, the reeling drum has an active brake that in the event of a malfunction of the hovering platform can be activated to hold the hovering platform through the cable. The excessive pulling force from the respective hovering platform may directly result from the hovering platform experiencing an impaired generation of lift. As an alternative or in addition thereto, the power supply to the hovering platform may be electrically connected to an electric brake or arresting mechanism of the reeling drum. For example, the reeling drum is released if the power supply is active. If the electrical power is interrupted, a brake mechanism of the reeling drum may be brought into an arresting state through a resilient element, in which the reeling drum is arrested. Thus, once the hovering platform is not supplied with electrical power, leading to a descent, the reeling drum would automatically be arrested. The brake mechanism may comprise an electromagnetically supported pin in a first element of the reeling drum, which is retracted from a hole in a second element of the reeling drum, which is movable relative to the first element. The pin is retracted from the hole through the electrical power supply and is pushed into the hole by a spring if the electrical power supply is interrupted.

In an advantageous embodiment, the transverse holding element comprises an elongated beam having a first end connected to the vertical pole and a second end facing away from the vertical pole, wherein the cable is held at least on the second end and comprises a transfer section extending to the hovering platform. The transfer section of the cable is a free section of the cable that extends between the hovering platform and an outer end of the transverse holding element. The elongated beam allows to place a holding point for the cable and for the hovering platform laterally away from the ground vehicle. This not only increases the operation radius of the hovering platform, but also prevents an impact of the hovering platform on the ground vehicle in the case of a malfunction.

In an advantageous embodiment, the transverse holding element comprises a chain of swivably coupled, actively articulated elongated beams, wherein the cable is routed along the chain of articulated beams, and wherein the hovering platform is held at an outer end of the chain of articulated beams through the cable or a rope as the additional component. The chain of actively articulated elongated beams allows a higher flexibility in positioning the cable relative to the ground vehicle and the hovering platform. For example, an increased flexibility in different operational altitudes for the hovering platform is provided.

In an advantageous embodiment, the articulated beams are actively moved to follow the motion of the respective hovering platform. They can be moved by small electric actuators, such as step motors. Since the articulated beams do not need to provide high forces, their articulation can be achieved by simple, inexpensive and compact devices.

In an advantageous embodiment, the at least one hovering platform may simply be adapted for providing a lift force, wherein the chain of articulated beams is adapted to guide the at least one hovering platform to a required spatial position. Thus, the respective hovering platform may be realized with even further reduced costs.

In an advantageous embodiment, the at least one ground vehicle comprises two ground vehicles, wherein the transverse holding element comprises a horizontal rope or wire extending between the vertical poles of the two ground vehicles, and wherein the at least one hovering platform is coupled with the horizontal rope or wire through a safety rope or wire loop. The horizontal rope may be arranged above the surface structure to be scanned and the hovering platform can more freely move in a lateral direction. However, to avoid descending below a certain altitude, they are loosely coupled with the horizontal rope through safety rope or a safety wire loop.

In an advantageous embodiment, a plurality of hovering platforms is coupled with the horizontal rope or wire, and wherein the safety rope or wire loop size for at least one of the hovering platforms is smaller than the size for at least another one of the hovering platforms according to a predetermined height of the surface structure to be placed underneath the safety rope or wire loop. Thus, the size of the safety rope loop or the safety wire loop is chosen according to the intended position relative to the surface structure to be scanned.

In an advantageous embodiment, the height of the vertical pole is adjustable. This may be done actively, for example through a linear gear drive, a spindle drive, an inflatable telescopic tube as a vertical pole or by passive means, such as a telescopic pipe with a latching mechanism that allows to latch one of the telescopic tube members in different positions of another telescopic tube member. In doing so, the height of the vertical pole is simply adjustable to the surface structure to be scanned, e.g., for different types of spacecraft or aircraft.

In an advantageous embodiment, the vertical pole is actively or passively rotatable. Thus, the vertical pole may swivel about its vertical axis to simplify the process of following the hovering platform's motion. As an alternative to this, the transverse holding element may be supported on the vertical pole in a rotatable manner, i.e., the holding element itself may rotate around the vertical pole about the vertical pole axis.

In an advantageous embodiment, the at least one hovering platform comprises a plurality of lift producing, electrically driven propellers with a substantially vertical thrust axis. Thus, common designs of multi-copters may be used, which are commercially available with precise flight characteristics.

In an advantageous embodiment, the at least one ground vehicle comprises a control unit for the at least one hovering platform to individually control the lift producing propellers to move the at least one hovering platform to a desired spatial position and maintain the position for a predetermined amount of time. Thus, the individual hovering platforms do not require dedicated flight control electronics, may be realized in the form of inexpensive replaceable devices and may be combined with more or less additional hovering platforms depending on the size of the surface structure to be scanned.

In an advantageous embodiment, the vertical pole is a hollow tube having a length of at least 2.5 m and is made from a fiber reinforced plastic material and/or a metallic material. As explained above, the vertical poles may even be adjustable in length. Since the vertical poles do not need to provide a distinct structural stability, they may comprise a rather small diameter and may be flexible. It is conceivable to let the vertical poles extend to a height of 3 to 4 m, while the diameter may be as small as 2.5 cm to clearly less than 10 cm, e.g., in a region of 3 to 5 cm. They may be made from aluminum or carbon fiber reinforced plastic. The vertical poles may be made from a plurality of sections, e.g., four sections having a length of about 1 m each. They may be sticked together to create the vertical pole. However, they may be telescopic and comprise latching holes in a desired distribution.

In analogy, the elongated beams or the articulated elongated beams mentioned above may be created with the same material and suitable dimensions.

In an advantageous embodiment, the ground vehicle comprises a weight of at least 80 kg. Preferably, the center of gravity of the ground vehicle is as close to the ground as possible. It is assumed that the ground vehicle, which may be based on an industry standard ground robot, may have a weight of above 100 kg including a set of rechargeable batteries, a sturdy chassis, enclosure and drive arrangement. By having such a weight, the ground vehicle constitutes a sturdy base that does not tip over in case of a hovering platform being held by the transverse holding element. It is conceivable that the hovering platform weigh clearly less than 5 kg including the inspecting device.

In an advantageous embodiment, the ground vehicle comprises at least one landing platform for receiving and storing a hovering platform before or after use of the system. The mobility of the system can be maintained. It is possible to let the ground vehicle move to and away from the surface structure before and after completing the process of scanning or inspecting it. It is possible to let the ground vehicle dock in a docking station for recharging, wherein the ground vehicle may autonomously move to the surface structure after recharging, while the at least one hovering platform is safely parked on the respective landing platform.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show.

DETAILED DESCRIPTION OF THE PREFERRED EMBODIMENTS

Figure 1:
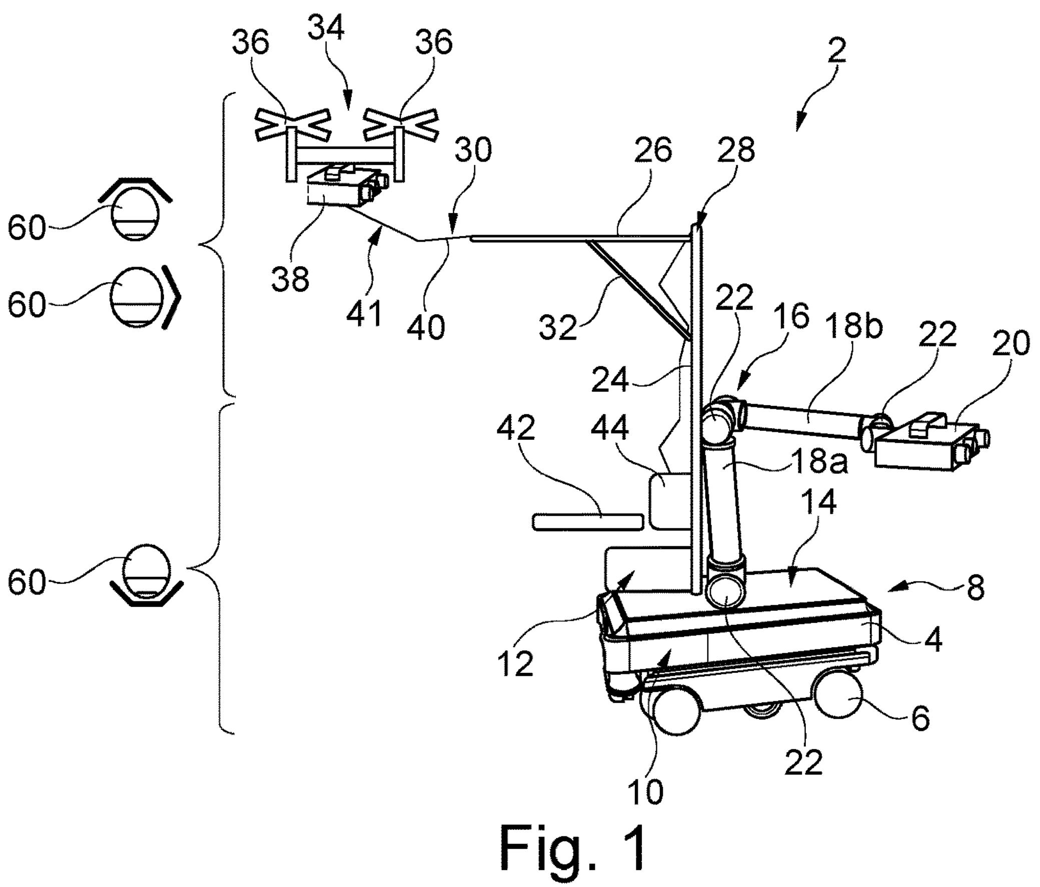
FIG. 1 shows a first exemplary embodiment of a system for scanning or inspecting an aircraft or spacecraft surface with a horizontal beam.

FIG. 1 shows a system 2 for scanning or inspecting an aircraft or spacecraft surface structure. The system 2 comprises a ground vehicle 4 having a plurality of wheels 6 for standing on the ground. At least one of the wheels 6 is driven, exemplarily by an electric motor, which is not shown in detail herein. The ground vehicle 4 comprises a frame structure 8, which is designed to receive a replaceably held rechargeable battery 10. Furthermore, a control unit 12 is attached to the ground vehicle 4 and serves for several functions that are explained further below.

At a top side 14 of the ground vehicle 4, a first arm 16 having two arm members **18*a* and 18*b* is provided, wherein the first arm 16 carries a first inspection device 20. The first arm 16 comprises a plurality of joints 22, which allow to move the first inspection device 20 in several directions. The ground vehicle 4 may move along the respective aircraft or spacecraft surface structure, arrest at a desired position and scan the surface structure section by section with the first inspection device 20. Data that is generated by the first inspection device 20 is fed into a computing unit having a controller, which is not shown in detail herein, but may be arranged inside the ground vehicle 4 or in an external apparatus. Since the aircraft or spacecraft surface structure comprises a rather large height, the first inspection device 20 as well as the first arm 16** are designed to primarily scan a lower half of the surface structure.

At the top side 14 of the ground vehicle 4, a vertical pole 24 is provided, which clearly extends above the first arm 16. A transverse holding element in the form of an elongated beam 26 is provided, which has a first end 28 and a second end 30. The first end 28 directly adjoins the upper end of the vertical pole 24 and extends substantially in a horizontal alignment from the vertical pole 24. For increasing the stability, a diagonal stiffening beam 32 is arranged between the elongated beam 26 and the vertical pole 24.

A hovering platform 34 having a plurality of electrically driven propellers 36 and carrying a second inspection device 38 is provided and electrically connected to the ground vehicle 4 through a cable 40. The cable 40 is routed along the elongated beam 26 and the vertical pole 24. The hovering platform 34 is supplied with electrical power through a transfer section 41, i.e., a section that extends from the second end 30 to the hovering platform 34, of the cable 40 and, preferably, data generated by the second inspection device 38 is transferred to the ground vehicle 4 through the cable 40.

The hovering platform 34 is adapted to lift the second inspection device 38 to a desired altitude/height and a desired position relative to the ground vehicle 4. As it does not need to carry its own battery, it may be designed as lightweight as possible. The second inspection device 38 is dedicated for scanning an upper half of the surface structure and, depending on the size of the structure, also lateral sides of it. Hence, the system 2 is adapted for scanning a surface structure by at least two inspection devices 20 and 38 in cooperation.

A landing platform 42 is provided above the top surface 14 of the ground vehicle 4, which allows to land and park the hovering platform 34. In addition, a reeling drum 44 is provided underneath, on or above the top side 14, receives the cable 40 and releases length increments of the cable 40 upon a pulling force or retracts length increments upon the lack of a pulling force. If the hovering platform 34 moves relative to the second end 30 of the elongated beam 26, the free length of the cable 40 is thus automatically adjusted.

If the hovering platform 34 experiences a malfunction, it may not be able to provide a sufficient lifting force to maintain a desired altitude and may descent. Due to mechanical connection to the cable 40, the hovering platform 34 will be held by the arrangement of the vertical pole 24 and the elongated beam 26 through the cable 40. To further improve this, the reeling drum 44 could be designed comparable to a seat belt retractor in a car that arrests upon a sudden pulling force on a belt. Hence, if the hovering platform 34 descents from its operational altitude, it will suddenly pull on the cable 40, leading the reeling drum 44 to arrest and hold the hovering platform 34 clearly above the ground.

It is conceivable, that the control unit 12 is capable of controlling hovering platform 34 to maintain a stable attitude and altitude. Consequently, the hovering platform 34 only needs to be equipped with usual attitude and altitude sensors, but does not necessarily need to comprise expensive control electronics. A failed hovering platform 34 may thus be replaced with clearly limited costs.

The arrangement of the vertical pole 24 and the elongated beam 26 does not require a high mechanical stability or rigidity, since only the cable 40 needs to be mechanically held. In the unlikely case of a failure of the hovering platform 34, however, it is tolerable to elastically deform this arrangement. The rigidity or stability of this arrangement is not crucial for achieving a positioning precision of the hovering platform 34 at all.

It is also conceivable that the vertical pole 24 is rotatably supported on the ground vehicle 4 to adjust its alignment when the hovering platform 34 changes a relative position to the ground vehicle 4. It is possible to provide a passive rotatability of the vertical pole 24, but also an active movability through an actuator.

Figure 2:
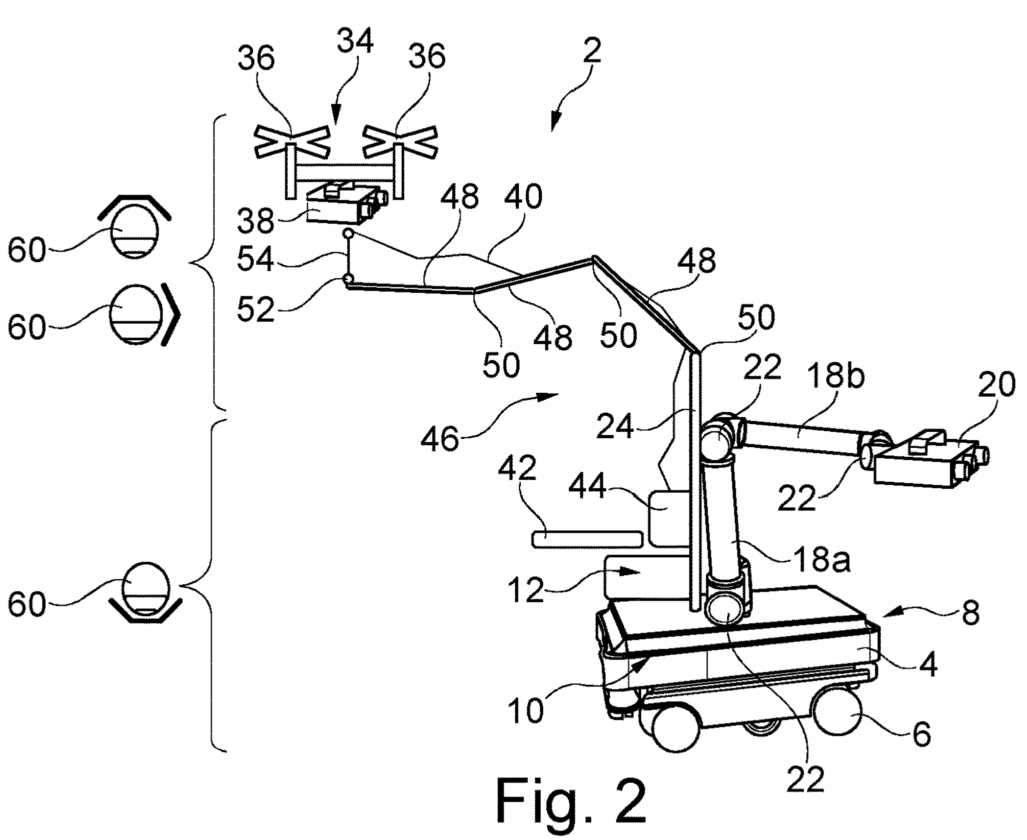
FIG. 2 shows a second exemplary embodiment of a system for scanning or inspecting an aircraft or spacecraft surface with a second arm.

In FIG. 2 the system 2 is slightly modified in that the elongated beam 26 as the transverse holding element is replaced by a second arm 46 with a chain of swivably coupled, actively articulated elongated beams 48. They comprise three joints 50 and an outer end 52. A rope 54 as an additional component is attached to the outer end 52 and is mechanically coupled with the hovering platform 34. The cable 40 is routed along the vertical pole 24 and second arm 46. The second arm 46 may actively follow the position of the hovering platform 34, or, as explained below, may even actively guide the hovering platform 34.

In case of a malfunction of the hovering platform 34, the second arm 46 may simply maintain its position and the hovering platform 34 will held by the rope 54 at the outer end 52 of the second arm 46. Again, the articulated and elongated beams 48 do not require a high structural stability or a set of strong actuators, since the second arm 46 only needs to carry the cable 40. If the hovering platform 34 experiences an impaired generation of lift and descents, the second arm 46 elastically deforms, but substantially maintains its position to prevent the hovering platform 34 from descending below a certain altitude.

The hovering platform 34 may be realized in an even further cost-effective way in that it simply provides a lifting function. The second arm 46 is then controlled by the control unit 12 to move the operating hovering platform 34 to a desired position for scanning or inspecting the surface structure. Then, the hovering platform 34 requires less sensors to operate.

Figure 3:
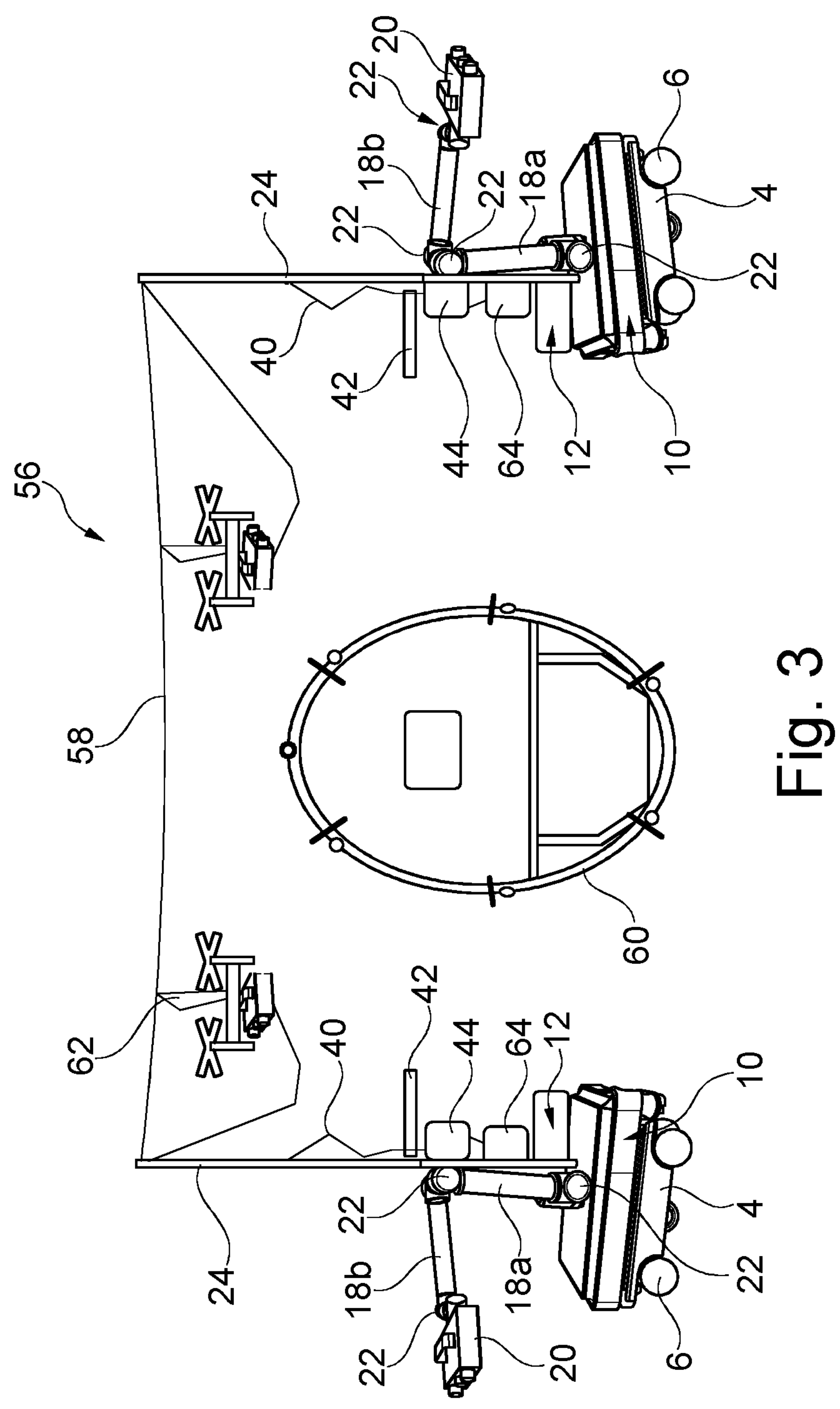
FIG. 3 shows a third exemplary embodiment of a system for scanning or inspecting an aircraft or spacecraft surface with a horizontal rope; and, FIG. 4 shows a fourth exemplary embodiment of a system for scanning or inspecting an aircraft or spacecraft surface with a vertical pole and a transversally extending cable.

In a modified system 56 shown in FIG. 3, two ground vehicles 4 are provided, which each comprise a vertical pole 24, between which a transverse holding element in form of a horizontal rope 58 extends. Thus, the arrangement of vertical poles 24 and the horizontal rope 58 embrace a surface structure 60 to be scanned. The rope 58 may exemplarily be attached to both vertical poles 24. The ground vehicles 4 would then need to be controlled to move in a cooperative way to maintain the horizontal rope 58 comprising a sufficient tension. Thereby, they may move along the surface structure 60 at the same time and in the same direction. However, in this exemplary embodiment, rope reeling devices 64 are provided, which hold and release the horizontal rope 58 and maintain a certain tension of it. Thus, the horizontal rope 58 will always remain in a sufficient height above the surface structure 60 to be scanned.

In this exemplary embodiment, two hovering platforms 34 are provided, wherein each hovering platform 34 is connected to a one of both ground vehicles 4. The cable 40 for each hovering platform 34 is held by the respective vertical pole 24 and extends to the respective hovering platform 34.

Both hovering platforms 34 are loosely coupled to the horizontal rope 58 by individual wire loops 62, which are wound around the horizontal rope 58 and connected to the hovering platforms 34. The sizes of the loops 62 are chosen to ensure a sufficient freedom of motion for the hovering platforms 34, but to hold the hovering platforms 34 in a failure case above the ground vehicles 4 and above the surface structure 60. To prevent the horizontal rope 58 from moving down to the surface structure 60, the rope reeling devices 64 comprise a self-arresting function, similar to a belt retractor in a car. Thus, in case a sudden tension acts onto the horizontal rope 58, the rope reeling devices 64 arrest and the hovering platforms 34 can be safely held.

Figure 4:
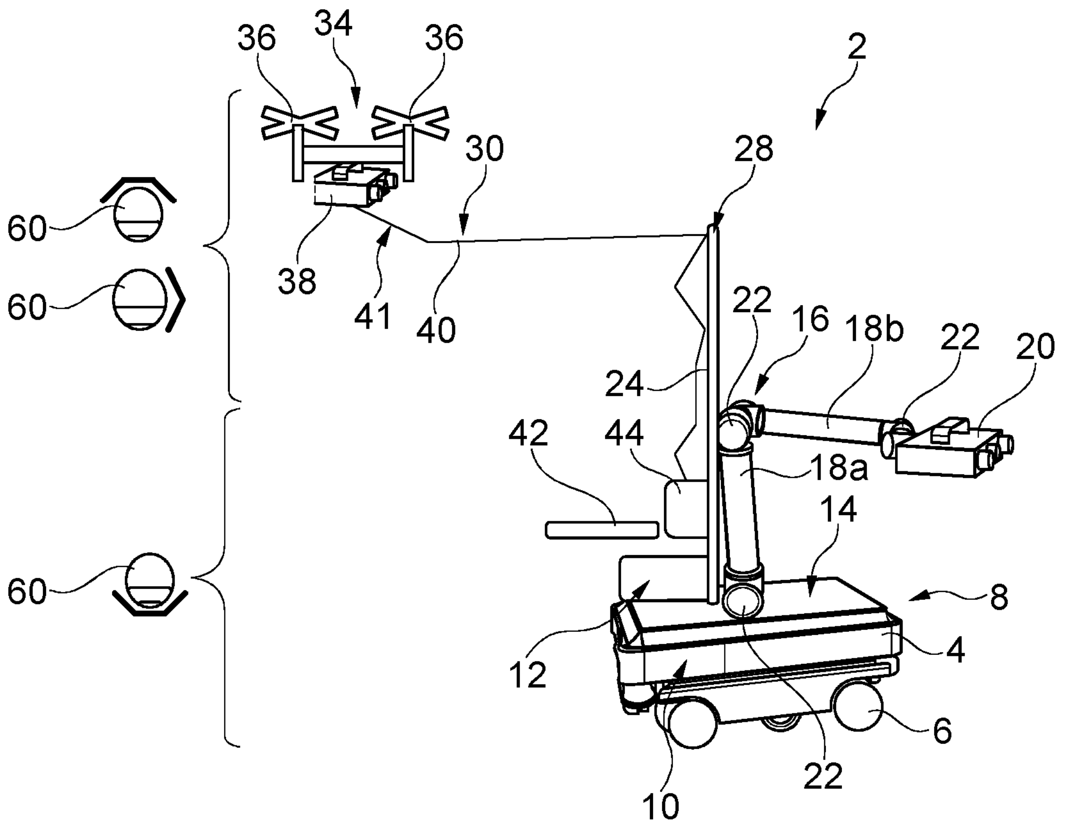

Lastly, FIG. 4 shows a system 66, which is similar to the system 2 of FIG. 1, but without having a dedicated elongated beam 26. The cable 40 is held on the vertical pole 24 alone.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS

2 system
4 ground vehicle
6 wheel
8 frame structure
10 battery
12 control unit
14 top side
16 first arm
18*a, b* arm member
20 first inspection device
22 joint
24 vertical pole
26 elongated beam
28 first end
30 second end
32 diagonal stiffening beam
34 hovering platform
36 propeller
38 second inspection device
40 cable
41 transfer section
42 landing platform
44 reeling drum
46 second arm
48 articulated elongated beam
50 joint
52 outer end
54 rope
56 system
58 horizontal rope
60 surface structure
62 loop
64 rope reeling device
66 system

The invention claimed is:

1. A system for scanning or inspecting an aircraft or spacecraft surface structure, comprising:

at least one ground vehicle carrying at least one first inspection device, at least one hovering platform carrying at least one second inspection device, wherein the at least one first inspection device is arranged on a first arm arranged on the at least one ground vehicle, wherein the at least one ground vehicle comprises a vertical pole, wherein a transverse holding element extends from the vertical pole, wherein the at least one hovering platform is electrically connected to the at least one ground vehicle through a cable for transferring electrical power and data to the at least one hovering platform, wherein at least one of the vertical pole and the transverse holding element carries the cable, wherein the at least one hovering platform is flexibly held on at least one of the vertical pole and the transverse holding element through the cable or an additional component, wherein the at least one first inspection device is configured to determine a characteristic of the surface structure and to identify points of shape deviation by comparison with an intended characteristic, and wherein the system is configured for successively inspecting the surface structure through the at least one first inspection device and the at least one second inspection device being arranged in different heights at the same time.

2. The system of claim 1, wherein the at least one ground vehicle comprises a reeling drum for the cable, and wherein the reeling drum is configured for providing a tensioning force onto the cable.

3. The system of claim 2, wherein the reeling drum is configured for arresting the cable upon an excessive pulling force from the respective hovering platform or upon power supply interruption of the cable, the at least one ground vehicle, or both.

4. The system of claim 1, wherein the transverse holding element comprises an elongated beam having a first end connected to the vertical pole and a second end facing away from the vertical pole, and wherein the cable is held at least on the second end and comprises a transfer section extending to the at least one hovering platform.

5. The system of claim 1, wherein the transverse holding element comprises a chain of swivably coupled, actively articulated elongated beams, wherein the cable is routed along the chain of swivably coupled, actively articulated elongated beams, and wherein at least one the hovering platform is held at an outer end of the chain through the cable or a rope as the additional component.

6. The system of claim 5, wherein the chain of swivably coupled, actively articulated elongated beams is actively moved to follow a motion of the respective hovering platform.

7. The system of claim 1, wherein the at least one ground vehicle comprises two ground vehicles, wherein the transverse holding element comprises a horizontal rope or wire extending between the vertical poles of the two ground vehicles, and wherein the at least one hovering platform is coupled with the horizontal rope or wire through a safety rope or wire loop.

8. The system of claim 7, wherein a plurality of hovering platforms is coupled with the horizontal rope or wire, and wherein a size of the safety rope or wire loop for at least one of the hovering platforms is smaller than a size for at least another one of the hovering platforms according to a predetermined height of the surface structure to be placed underneath the safety rope or wire loop.

9. The system of claim 1, wherein a height of the vertical pole is adjustable.

10. The system of claim 1, wherein the vertical pole is actively or passively rotatable.

11. The system of claim 1, wherein the at least one hovering platform comprises a plurality of lift producing, electrically driven propellers with a substantially vertical thrust axis.

12. The system of claim 11, wherein the at least one ground vehicle comprises a control unit for the at least one hovering platform to individually control lift producing propellers to move the at least one hovering platform to a desired spatial position and maintain the position for a predetermined amount of time.

13. The system of claim 1, wherein the vertical pole is a hollow tube having a length of at least 2.5 m and is made from a fiber reinforced plastic material, a metallic material, or both.

14. The system of claim 1, wherein the at least one ground vehicle comprises a weight of at least 80 kg.

15. The system of claim 1, wherein the at least one ground vehicle comprises at least one landing platform for receiving and storing a hovering platform before or after use of the system.

* * * * *